(12) United States Patent
Buelna et al.

(10) Patent No.: US 6,509,749 B1
(45) Date of Patent: Jan. 21, 2003

(54) OIL CONDITION TREND ALGORITHM

(75) Inventors: Carlos Buelna, Chichuahua (MX); Lorenzo Guadalupe Rodriguez, El Paso, TX (US); Axel H Berndorfer, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/929,786

(22) Filed: Aug. 14, 2001

(51) Int. Cl.$^7$ ............................................. G01R 27/08
(52) U.S. Cl. ...................................... 324/698; 73/53.05
(58) Field of Search ................................. 324/698, 693, 324/663, 667; 73/53.05–53.07, 35.02; 340/438, 439, 449, 450.3; 701/29–30; 116/DIG. 42

(56) References Cited

U.S. PATENT DOCUMENTS

| | | | |
|---|---|---|---|
| 5,060,156 A | * | 10/1991 | Vajgart et al. ............... 340/449 |
| 5,274,335 A | | 12/1993 | Wang et al. ................. 324/689 |
| 5,530,647 A | * | 6/1996 | Sem et al. ............. 364/424.03 |

* cited by examiner

*Primary Examiner*—Christine Oda
*Assistant Examiner*—Amy He
(74) *Attorney, Agent, or Firm*—Margaret A. Dobrowity

(57) ABSTRACT

An algorithm by which a time normalized oil condition trend (OCT) is developed. During engine off periods, while the engine is cooling, the vehicle's main computer program implements the trend algorithm according to the present invention by which engine oil conductivity (oil sensor output voltage) and temperature data are obtained in a specified temperature range, and are then input into a cool down equation to determine its coefficients using nonlinear regression. This cool down equation models oil conductivity as a function of temperature and is used at a specified time during an engine-on period to calculate an OCT point. Collectively, these OCT points determine the oil condition trend that is analyzed by a procedure called from the vehicle's main computer program to determine when an oil change is necessary.

9 Claims, 3 Drawing Sheets

OIL CONDITION TREND ALGORITHM

TECHNICAL FIELD

The present invention relates to engine oil condition, and more particularly to an algorithm for producing an oil condition trend by which the necessity of an oil change may be determined.

BACKGROUND OF THE INVENTION

An engine oil's usable life may vary considerably, depending on many factors, such as oil quality, engine type and condition, ambient conditions, and vehicle service schedule. Currently, automobile manufacturers recommend oil change intervals for gasoline engine powered cars and light-duty trucks of either 3 months/3000 miles or 12 months/7500 miles, depending primarily on the vehicle driving cycle and ambient conditions. The use of the proper quality (i.e., SG/CD) engine oil is assumed in recommending these intervals. Several problems exist with the current method of specifying oil change intervals:

(1) The vehicle's Owner's Manual may not be read.
(2) Most drivers do not fit neatly into either of the two discrete intervals recommended. Many drivers should probably change oil somewhere between 3months/3000 miles and 12 months/7500 miles.
(3) Most drivers do not keep track of dates of oil changes.
(4) Most drivers do not keep track of mileage between oil changes.

A variety of oil condition sensor systems are known whose output voltage is related to oil conductivity. Systems, utilizing such oil condition sensors, employ computer algorithms to decide when an oil change is necessitated, assuming "normal" engine function and the proper quality and amount of oil in the reservoir. These systems calculate effective oil life by developing an oil condition trend (OCT), based on oil temperature and conductivity verses miles driven or engine-on time, from which an oil change trigger point is determined. The conventional method for developing an oil condition trend specifies that the average of all conductivity points between a fixed temperature range (i.e. 80° C. ±1° C.), when the engine oil is heated up, should be part of the OCT. There are three issues or risks associated with this methodology:

(1) OCT points are calculated during engine operation. Due to the oil condition sensor's inherent thermal lag, varying engine operating conditions can cause significant errors in the OCT due to sudden temperature variations while the engine is running. These false points create unwanted fluctuation or noise in the OCT, thus reducing the accuracy of the change oil trigger points.
(2) In some applications, OCT points are measured only at a specified temperature. If the engine's operating conditions are not meeting this particular temperature frequently enough, the accuracy of the OCT suffers or a condition without any OCT at all could occur as a worst case.
(3) The times between the OCT points can vary significantly.

FIG. 1 depicts the conventional methodology of generating a typical engine heat-up (engine-on) OCT for a temperature point of 80° C. of a vehicle engine filled with the proper amount of Sunoco 5W-30 oil. The axis 10 represents accumulated engine-on time (in hours) under "normal" driving conditions whereas the axis 12 represents an oil conductivity signal (OCS) (i.e. an oil condition sensor output (in volts)). The first OCT point 14 is defined at an OCS when engine oil temperature reaches 80° C. while the engine is running (i.e. on). Subsequent OCT points 16 are defined in a similar manner before which engine oil temperature has cooled below 80° C. during engine-off periods (cool down cycles). As can be seen in FIG. 1, the OCT is not time normalized, whereby the time between OCT points can vary significantly, and there are, also, a number of false points (i.e., noise) which can lead to a substantial error in the OCT profile.

Accordingly, what is needed is a more robust method of generating an OCT wherein the previously mentioned issues are addressed.

SUMMARY OF THE INVENTION

The present invention is an algorithm by which a time normalized OCT is developed without the shortcomings of the conventional method. During engine off periods, while the engine is cooling, the vehicle's main computer program implements the trend algorithm according to the present invention by which engine oil conductivity (oil sensor output voltage) and temperature data are obtained in a specified temperature range (i.e. 80° C. to 50° C.).

The acquisition of these data while the engine is cooling eliminates the false points of the conventional method. This requires that the oil condition sensor distinguish between engine-on and engine-off conditions. It then needs to be able to take measurements after the ignition is turned off. This requires a power connection independent from the ignition switch (battery power). The sensor could then be powered for a certain time after the ignition is off, for example, two hours, to take continuous measurements of oil conductivity data over oil temperature. To save battery power, the sensor could also be switched on and off at certain intervals to take a sufficient number of readings. This condition could be called "sleep mode" in which the sensor "wakes up" at certain time intervals to take readings. The means to accomplish the above is well known in the art.

These acquired data are then input into a second order polynomial equation (the cool down equation) to determine its coefficients using nonlinear regression (i.e. least squares fit). This cool down equation models oil conductivity as a function of temperature and is used at a specified time during an engine-on period to calculate an OCT point. Data from subsequent proper engine-off periods generate different values for the coefficients, since oil conductivity changes with time and use, thereby resulting in different values for the coefficients of each calculated OCT point during subsequent engine-on periods. Collectively, these OCT points determine the oil condition trend that is analyzed by a procedure called from the vehicle's main computer program to determine when an oil change is necessary.

An example of an oil sensor system is described in U.S. Pat. No. 5,274,335, issued on Dec. 28, 1993 to Wang et al, the disclosure of which is hereby incorporated herein by reference.

Accordingly, it is an object of the present invention to develop a time normalized OCT without the shortcomings of the conventional method to determine when an oil change is necessary.

This, and additional objects, advantages, features, and benefits of the present invention will become apparent from the following specification.

DESCRIPTION OF THE PREFERRED EMBODIMENT

Figure 1:
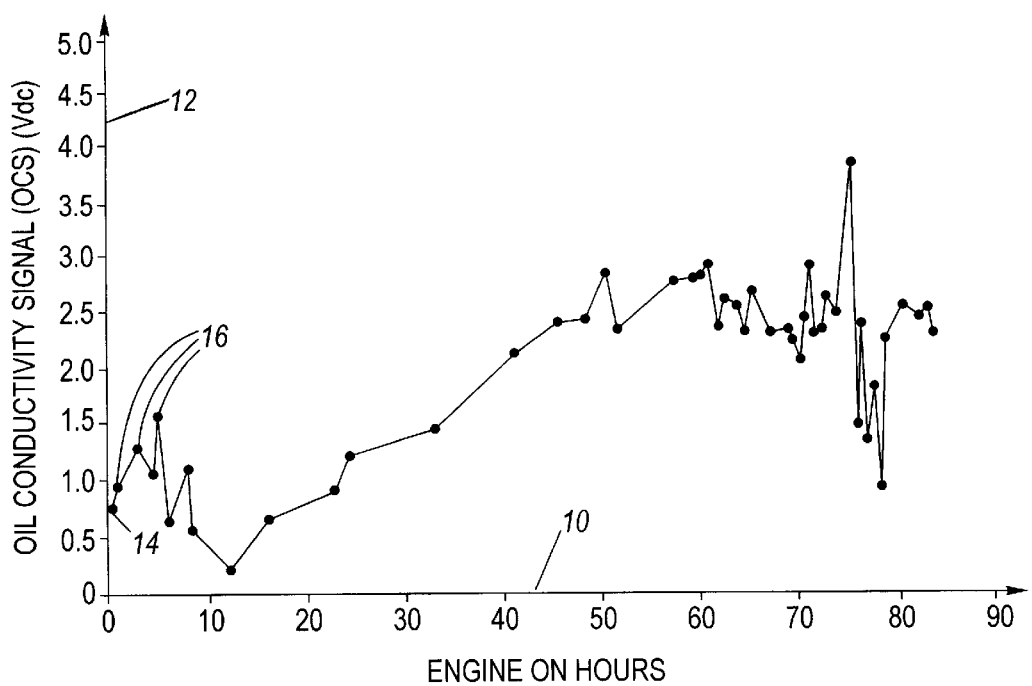
FIG. 1 depicts a conventional oil condition trend according to the prior art.
Figure 2:
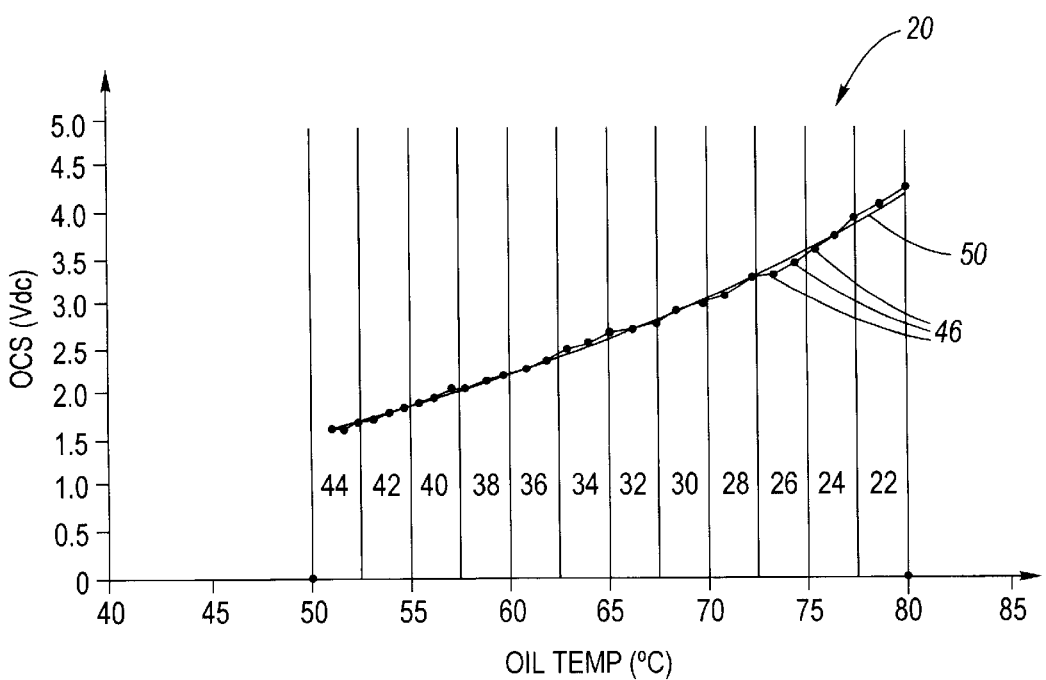
FIG. 2 depicts a typical cool down profile used to generate a cool down equation according to the present invention.
Figure 3:
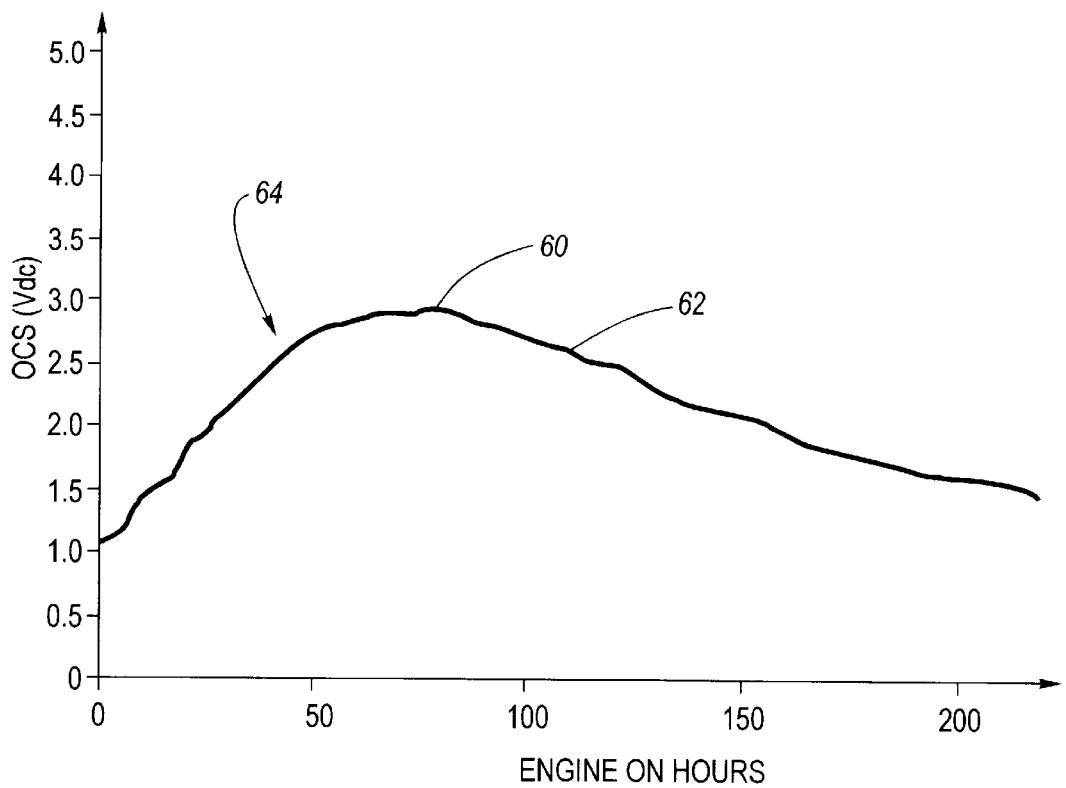
FIG. 3 depicts an example of a normalized OCT according to the present invention.
Figure 4A:
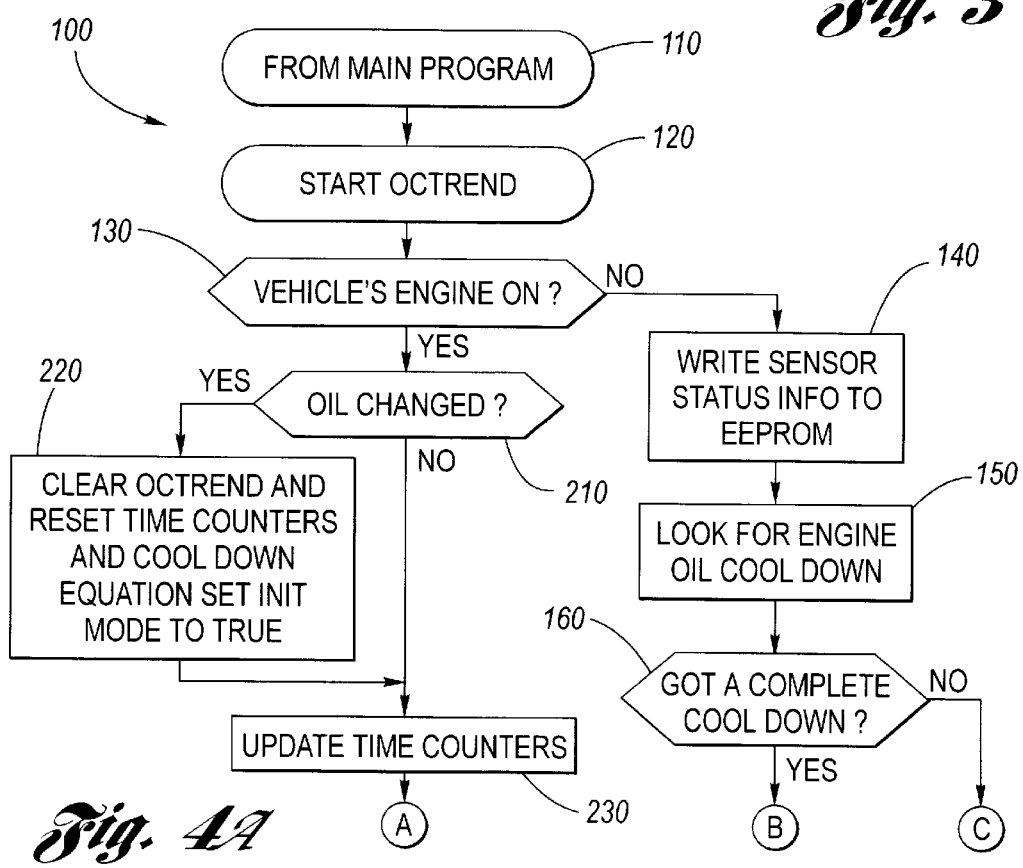
FIG. 4 is a flow diagram for implementing the trend algorithm according to the present invention.
Figure 4B:
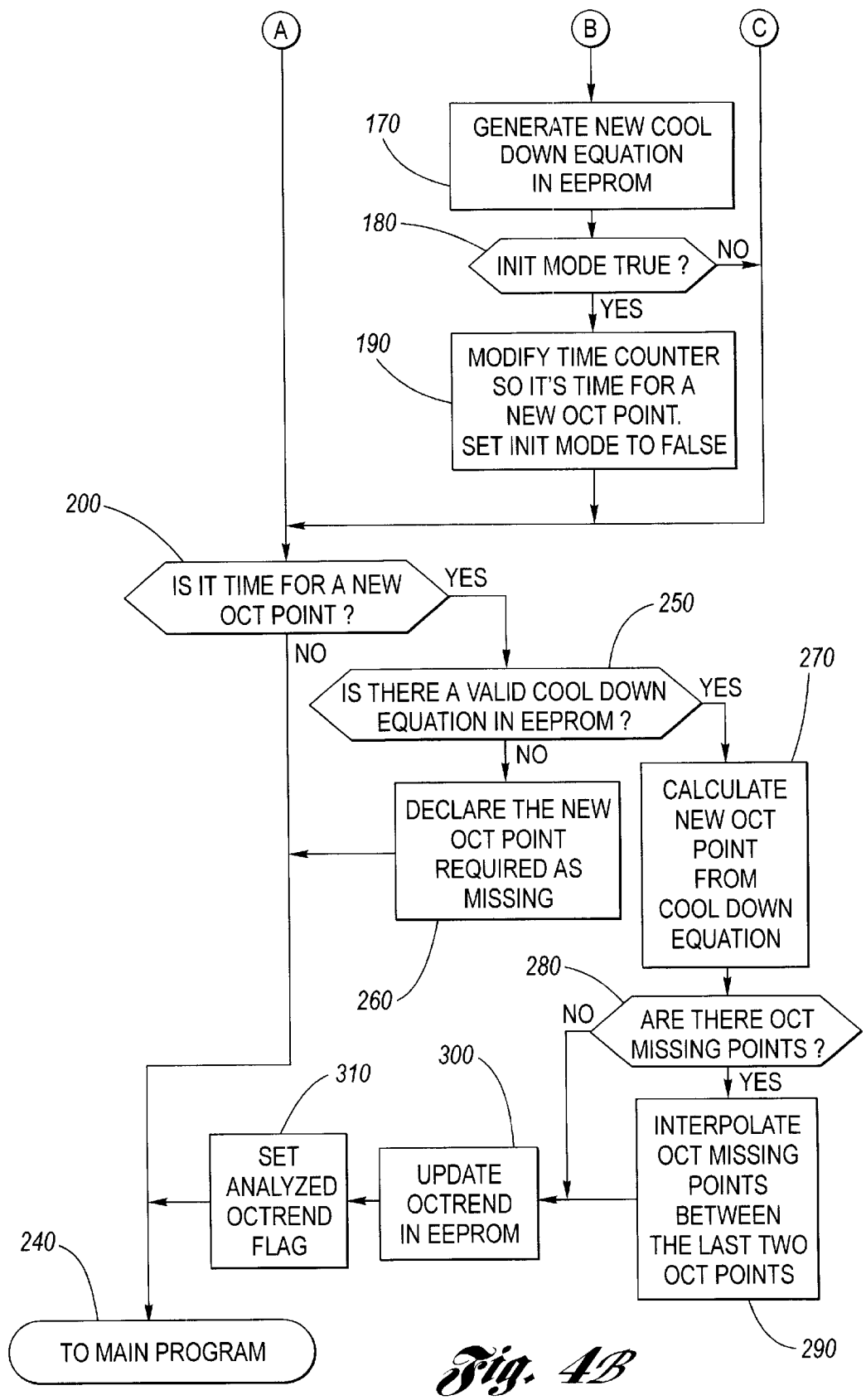

Referring now to FIGS. 2 through 4, FIG. 2 depicts a cool down profile 20 used to generate a cool down equation according to the present invention wherein oil condition sensor (OCS) output voltage is plotted verses engine oil temperature within a temperature range of, preferably, 80° C. to 50° C.

The temperature range is divided into, preferably, twelve zones 22–44 wherein data points 46 are obtained. Preferably, one data point 46 per zone from each zone 22–44 is used to determine the coefficients a, b, and c of a cool down equation:

$$V = aT^2 + bT + c$$

utilizing nonlinear regression techniques (i.e. least squares fit), wherein V represents the OCS output voltage at a specified engine oil temperature T in degrees Celsius, preferably 70 degrees Celsius. The cool down equation is represented by smooth line 50 of FIG. 2. If this cool down equation satisfies specified time constraints (i.e. it is young enough), it is used at a specified time during an engine-on period to calculate an OCT point, (i.e. 60 of FIG. 3). Any missing OCT points are interpolated between the just calculated OCT point and the previous OCT point calculated utilizing the previous valid cool down equation, wherein the temperature T has a set value of, preferably, 70 degrees Celsius in each cool down equation. Missing OCT points are OCT points which can not be calculated at the specified time at which an OCT point is to be calculated during an engine-on period because there is no valid cool down equation. Such OCT points are declared as missing and accommodated as described above. Data points, such as 46 of FIG. 2, from subsequent valid engine-off periods generate different values for the coefficients a, b, and c, since oil conductivity changes with time and use. Thus each new cool down equation generated results in a different calculated value for an OCT point, such as 62 of FIG. 3, at specified times during subsequent engine-on periods, wherein the temperature T has a set value of, preferably, 70 degrees Celsius for each calculated OCT point. Collectively, these OCT points, such as 60 and 62 of FIG. 3, determine a normalized oil condition trend (OCT) 64, as exemplified by FIG. 3, that is analyzed by the main computer program to determine when an oil change is necessary FIG. 4 is a flow diagram 100 exemplifying implementation of the trend algorithm according to the present invention by which the OCT 64 of FIG. 3 is generated. At block 110, the vehicle's main computer program calls the algorithmic procedure. At block 120, the algorithm is initiated. Block 130 checks if the engine is running.

If the engine is running at block 130, control passes to block 210. Block 210 checks if the oil has been changed. If no, then control passes to block 230. Otherwise, at block 220, the OCT is cleared, the time counters and the cool down equation are reset, and the initialization mode is set to true. Control then passes to block 230. The time counters are updated at block 230 and control is passed to block 200.

If the engine is not running, oil condition sensor status is written to microprocessor memory at block 140 and data collection during cool down is initiated at block 150. Block 160 checks if a complete cool down has occurred. If not, control is transferred to block 200. Otherwise a new cool down equation is generated at block 170, as previously described. Block 180 checks if the initialization mode is true. If not, control is passed to block 200. Otherwise, the time counter is modified and the initialization mode is set to false at block 190. Control then passes to block 200.

It is to be noted that a new engine must contain the proper quantity and quality of oil before it can be run. Hence, a complete cool down cannot occur at block 160 until the engine has been turned on for the first time. In the case where a new engine contains the proper quantity and quality of oil but has not been turned on for the first time, control will pass from block 160 to block 200 then to either block 240 or to blocks 250, 260, and 240. In either case, when the engine is turned on for the first time, control will pass from block 130 to block 210 to block 220 whereat the OCT is cleared, the time counters and the cool down equation are reset, and the initialization mode is set to true.

Block 200 checks if it is time for a new OCT point. If not, control passes back to the vehicle's main computer program at block 240. Otherwise, block 250 checks for a valid cool down equation. If there is not a valid cool down equation, the new required OCT point is declared as missing at block 260 and control then passes back to the vehicle's main computer program at block 240. Otherwise, if there is a valid cool down equation, a new OCT point is calculated from the cool down equation at block 270 as previously described. Block 280 checks for missing OCT points. If there are no missing OCT points, control passes to block 300. Otherwise, the missing OCT points are interpolated between the last two calculated OCT points at block 290. The OCT is updated and stored in memory at block 300. At block 310 the "Set Analyzed OCTrend" flag is set for use by the vehicle's main computer program in determining when an oil change is necessary and control then passes back to the vehicle's main computer program at block 240.

The continuous repetition of the above process, by which only one OCT point is calculated or declared missing at specified times during each engine-on period, generates the OCT points, such as 60 and 62 of FIG. 3, by which the OCT 64 is generated. The vehicle's main computer program analyzes the OCT 64 to determine when an oil change is necessary. The OCT 64 of FIG. 3 was generated from actual data and contains many interpolated points due to missing OCT points, as previously described. However, the general shape of the curve does not change.

To those skilled in the art to which this invention appertains, the above described preferred embodiment may be subject to change or modification. Such change or modification can be carried out without departing from the scope of the invention, which is intended to be limited only by the scope of the appended claim

What is claimed is:

1. A method for providing an oil condition trend for use in conjunction with an oil condition sensor voltage output, said method comprising the steps of:
    operating an internal combustion engine, wherein the engine heats;
    stopping operation of the engine, wherein the engine cools;
    generating a cool down equation during a predetermined range of cooling of the engine;
    operating the internal combustion engine; and
    calculating an oil condition trend point from the generated cool down equation.

2. The method of claim 1, wherein the cool down equation of said step of generating is given by $V=aT^2+bT+c$, wherein V is a voltage output of the oil condition sensor, wherein T is a plurality of temperatures selected over said range of cooling, and wherein a, b and c are constants.

3. The method of claim 2, wherein said step of generating provides the values of the constants a, b and c by conventional nonlinear regression techniques.

4. The method of claim 3, wherein said step of calculating comprises calculating a voltage, V', wherein $V'=aT'^2+bT'+c$ at a predetermined time of operation of said internal combustion engine, and wherein T' is a predetermined temperature.

5. The method of claim 4, further comprising, before said step of calculating, determining whether said step of generating has generated the cool down equation within a predetermined prior length of time.

6. The method of claim 5, wherein after said step of determining, declaring a missing oil condition trend point if said step of generating has not generated the cool down equation within the predetermined prior length of time.

7. The method of claim 6, further comprising interpolating each missing oil trend point using calculated oil trend points before and after each missing oil trend point, respectively.

8. The method of claim 7, wherein during said step of generating, the predetermined range of cooling comprises substantially between 80 degrees Centigrade and 50 degrees Centigrade.

9. The method of claim 8, wherein the predetermined temperature T' is substantially 70 degrees Centigrade.

* * * * *